(12) United States Patent
Chen

(10) Patent No.: US 8,897,036 B2
(45) Date of Patent: *Nov. 25, 2014

(54) SWITCHING REGULATOR, INCLUDING DEAD TIME ADJUSTING CIRCUIT, AND CONTROL DEVICE THEREOF

(75) Inventor: Jian Chen, Matsumoto (JP)

(73) Assignee: Fuji Electric Co., Ltd. (JP)

(*) Notice: Subject to any disclaimer, the term of this patent is extended or adjusted under 35 U.S.C. 154(b) by 72 days.

This patent is subject to a terminal disclaimer.

(21) Appl. No.: 13/523,348

(22) Filed: Jun. 14, 2012

(65) Prior Publication Data

US 2013/0010502 A1    Jan. 10, 2013

(30) Foreign Application Priority Data

Jul. 7, 2011    (JP) .................. 2011-150974

(51) Int. Cl.
H02M 3/335    (2006.01)
H02M 1/38    (2007.01)
H02M 3/338    (2006.01)

(52) U.S. Cl.
CPC .......... *H02M 3/3387* (2013.01); *Y02B 70/1433* (2013.01); *H02M 1/38* (2013.01)
USPC ...................... 363/21.02; 363/21.16

(58) Field of Classification Search
CPC . H02M 1/38; H02M 3/28; H02M 2001/0058; H02M 2007/4815; Y02B 70/1433
USPC .......... 363/21.01–21.04, 21.08, 21.12, 21.18, 363/16, 78, 95, 97; 323/271, 282–285, 351
See application file for complete search history.

(56) References Cited

U.S. PATENT DOCUMENTS 6,018,467 A * 1/2000 Majid et al. ...................... 363/16
7,019,986 B2 * 3/2006 Yokoyama et al. ............ 363/16

(Continued)

FOREIGN PATENT DOCUMENTS

JP    2005-051918 A    2/2005
JP    2007-006614 A    1/2007

(Continued)

*Primary Examiner* — Timothy J Dole
*Assistant Examiner* — Ivan LaBoy Andino
(74) *Attorney, Agent, or Firm* — Rossi, Kimms & McDowell LLP

(57) ABSTRACT

A switching regulator related to aspects of the invention can include an auxiliary winding for monitoring the voltage across the primary winding of a transformer, a differentiation detecting circuit that detects the timing of reversal start or reversal end of the signal detected by the auxiliary winding and a dead time adjusting circuit that receives a signal to trigger turn OFF of a first switch or a second switch and, after passing a predetermined delay time from the detection of the signal, generates a signal to trigger turn ON of the first switch or the second switch. The differentiation detecting circuit can confirm current transfer between body diodes. The dead time adjusting circuit can adjust a dead time to deliver the signal after a predetermined time from the confirmation of the current transfer. In some aspects of the invention, occurrence of hard switching and short-circuit current can be suppressed.

11 Claims, 10 Drawing Sheets

(56) References Cited

U.S. PATENT DOCUMENTS

| | | | |
|---|---|---|---|
| 8,391,026 B2* | 3/2013 | Santoro et al. | 363/16 |
| 8,416,582 B2* | 4/2013 | Usui | 363/16 |
| 2005/0078490 A1* | 4/2005 | Yokoyama et al. | 363/16 |
| 2005/0184714 A1 | 8/2005 | Rusu et al. | |
| 2006/0291117 A1 | 12/2006 | Kyono | |
| 2007/0076448 A1* | 4/2007 | Usui | 363/21.01 |
| 2009/0284991 A1* | 11/2009 | Nishikawa | 363/21.02 |
| 2010/0026381 A1* | 2/2010 | Huang | 327/544 |
| 2011/0007529 A1* | 1/2011 | Usui | 363/21.12 |
| 2013/0242620 A1* | 9/2013 | Hosotani | 363/21.09 |

FOREIGN PATENT DOCUMENTS

| | | |
|---|---|---|
| JP | 2009-027803 A | 2/2009 |
| JP | 2010-004596 A | 7/2010 |
| WO | 2005/079513 A2 | 9/2005 |

* cited by examiner

SWITCHING REGULATOR, INCLUDING DEAD TIME ADJUSTING CIRCUIT, AND CONTROL DEVICE THEREOF

BACKGROUND OF THE INVENTION

1. Field of the Invention

Embodiments of the invention relate to switching regulators and control devices of switching regulators.

2. Description of the Related Art

Known switching regulators to achieve high efficiency and low noise include a current resonant oscillation type that perform soft switching by using resonant oscillation operation with series-connected inductance and capacitance.

FIG. 12 shows an example of construction of a generally employed switching regulator of a current resonant oscillation type.

This regulator has a high side switch Qa and a low side switch Qb series-connected to form a switching circuit that is connected in parallel to a DC power supply Ed. The switches Qa and Qb have built-in body diodes Da and Db anti-parallel connected to the respective switches. A series-connected circuit composed of a primary winding P1 of a transformer T and a resonant oscillation capacitor Cr is connected in parallel to the low side switch Qb. A series connected resonant oscillation circuit is formed of a leakage inductance of the transformer T and the resonant oscillation capacitor Cr.

Secondary windings S1 and S2 of the transformer T are connected to a full-wave rectifying and smoothing circuit comprising diodes D1 and D2 and a smoothing capacitor Co. A load Ro is connected to the full-wave rectifying and smoothing circuit. The output side of the full-wave rectifying and smoothing circuit is also connected to a circuit for ON-OFF control of the switches Qa and Qb, the circuit comprising an error-amplifier circuit 1A, a voltage controlling oscillator circuit (VOC) 2A, a controller circuit 3A, and a driver circuit 4A.

This switching regulator sets a dead time in which both the switches Qa and Q b are in an OFF state, and the switches repeat ON and OFF operation alternately with a duty factor of about 50%. Current resonant oscillation operation takes place in the circuit including the resonance capacitor Cr and the leakage inductance of the primary winding P1 and the secondary windings S1 and S2 of the transformer T, performing power transmission from the primary side to the secondary side of the transformer T. The output from the secondary side of the transformer T is rectified by the diodes D1 and D2 and made smooth by the smoothing capacitor Co to deliver DC output voltage. This output voltage is detected by the error amplifier circuit 1A. The voltage controlling oscillator circuit 2A controls the oscillation frequency thereof corresponding to this output voltage. The controller circuit 3A and the driver circuit 4A perform alternating ON-OFF control of the two switches Qa and Q b. Thus, the output voltage is stabilized.

One of the advantages of the switching regulator of the current resonant oscillation type is that the regulator performs soft switching by using the body diodes Da and Db of the switches Qa and Qb. In the state the high side switch Qa is in an OFF state and the low side switch Qb is in an ON state with the current I_Qb flowing through the switch Qb in the direction of the arrow in FIG. 12, if the low side switch Qb is turned OFF from this state, then the current I_Qb that has been flowing in the switch Qb turns to flow through the body diode Da of the high side switch Qa. Since the voltage Vs between the switch Qa and the switch Qb is approximately the voltage Vi of the DC power supply Ed during a current is flowing in the body diode Da, even if the switch Qa is turned ON, the voltage across the switch Qa does not change rapidly. Thus zero voltage switching (ZVS) is achieved. Similarly, when the current I_Qa that has been flowing in the high side switch Qa is transferred to the body diode Db of the low side switch Qb, the voltage Vs between the switch Qa and the switch Qb becomes approximately the ground potential. Consequently, if the switch Qb is turned ON during a current is flowing in the body diode Db, the voltage across the switch Qb does not change rapidly, achieving zero voltage switching.

However, if the switch Qa or the switch Qb turns ON at a moment when the voltage Vs between the switch Qa and the switch Qb is a certain voltage between the voltage Vi of the power supply Ed and the ground potential, the switching is a hard switching. In this condition, rapid change arises in the current through the switch Qa or the switch Qb and in the voltage across the switch Qa or the switch Qb. This results in generation of noise and increase in the power loss at the switch Qa or the switch Qb. In addition, if the low side switch Qb turns ON during a current is running through the body diode Da of the switch Qa, a short-circuit current flows through the body diode Da from the DC power supply Ed to the switch Qb in the recovery time of the body diode Da. This short-circuit current can be an instantaneous heavy current causing destruction of the switches Qa and Qb.

Some proposals have been made to cope with the hard switching and the short-circuit current. Japanese Unexamined Patent Application Publication No. 2005-051918, also described herein as Patent Document 1, discloses a power supply in which a state of current flow through a body diode is detected by detecting a current through a resonant oscillation circuit and, during detecting the state, no driving signal to turn either of the two switches ON or OFF is generated. Japanese Unexamined Patent Application Publication No. 2010-004596, also referred to herein as Patent Document 2, discloses a power supply that does not generate short-circuit current. In this power supply, the ON-width of a turning ON signal for a low side switch is controlled relatively long immediately after start-up to inhibit turning ON of a high side switch during a period in which the current flowing through the low side switch is negative. Japanese Unexamined Patent Application Publication No. 2009-027803, also referred to herein as Patent Document 3, discloses a power supply in which solely a high side switch is turned ON and OFF immediately after start-up. After a resonant oscillation capacitor is changed to a level that allows normal resonant oscillation operation, switching operation using two switches is conducted. Japanese Translation of PCT Application Publication No. 2007-527190, also referred to herein as Patent Document 4, discloses a device that can deal with both hard switching and short-circuit current by directly detecting the voltage at a point between two switches. Japanese Unexamined Patent Application Publication No. 2007-006614, also referred to herein as Patent Document 5, discloses a power supply to cope with short-circuit current by detecting the voltage at a point between two switches.

However, the construction disclosed in Patent Document 1, which involves a resistor for current detection in the resonant oscillation circuit, causes a problem of power loss due to the resistor. The construction disclosed in Patent Document 2, in which the ON-width of a turn ON signal is adjusted immediately after start-up, only deals with the operation at the start-up, thus application period is limited. The construction disclosed in Patent Document 3, which performs resonant oscillation operation after charging the resonant oscillation capacitor, also limits application period to the time immediately after start-up. The constructions disclosed in Patent Document 4 and Patent Document 5, which involve detecting high voltage between switches, need to have a control circuit including high voltage circuit elements. This causes an enlarged scale of the control circuit and adversely affects terminal construction of an integrated circuit for the control circuit.

SUMMARY OF THE INVENTION

Embodiments of the invention have been made in view of the problems described above, as well as other problems, and embodiments of the invention provide a switching regulator and a control device thereof that suppress occurrence of hard switching and short-circuit current without greatly increasing a circuit scale and not being limited to the period immediately after the start of operation.

Embodiments of the invention provide a switching regulator and a control device thereof, the switching regulator comprises: a first switch and a second switch series-connected to each other and connected to the ends of a DC power supply; and a resonant oscillation circuit composed of a resonant oscillation capacitor and a resonant oscillation inductance including a primary winding of a transformer, the inductance being connected in series with the resonant oscillation capacitor.

In some embodiments, the transformer includes an auxiliary winding to detect voltage change across the primary winding of the transformer. Thus, the need for a high voltage element is eliminated from the part of detecting the voltage change across the primary winding. The voltage detected by the auxiliary winding is delivered to a differentiation detecting circuit and differentiated therein to detect a timing of the start of reversal of the detected voltage or a timing of the end of reversal of the detected voltage that is detected by the auxiliary winding. Thus, current transfer of a body diode is determined. The signal indicating the detected timing is delivered to a dead time adjusting circuit. The dead time adjusting circuit adjusts a dead time with a predetermined delay time on a timing signal detected after receiving a first trigger signal to turn OFF the first switch or the second switch. The delayed signal becomes a second trigger signal to turn ON the first switch or the second switch.

Because the control device of the switching regulator as stated above comprises the differentiation detecting circuit and the dead time adjusting circuit, current transfer of the body diode can be confirmed by detecting the voltage reversal start timing or reversal end timing of the voltage detected by the auxiliary winding. A dead time can be adjusted by waiting for a predetermined time after the detection of the reversal timing.

In the switching regulator and the control device thereof, the dead time can be adjusted to wait for a predetermined time after certifying absence of current flow in the body diode. Therefore, hard switching and short-circuit current can be suppressed.

DETAILED DESCRIPTION

Now, some embodiments of the invention will be described in detail in the following with reference to accompanied drawings.

Figure 1:
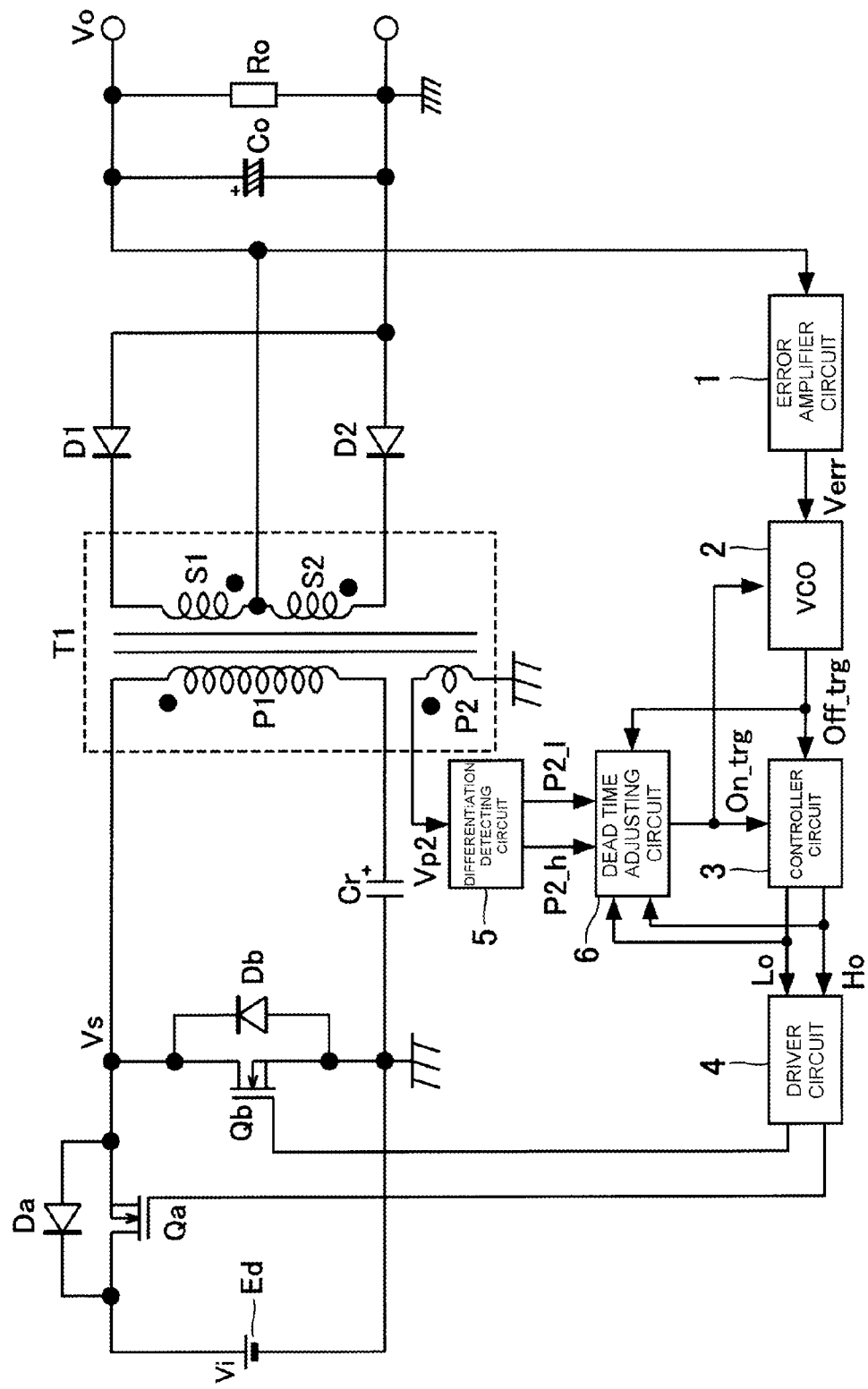
FIG. 1 shows a construction of a switching regulator of an embodiment according to embodiments of the invention.

FIG. 1 shows a construction of a switching regulator of an embodiment according to the invention.

This switching regulator comprises two switches Qa and Qb, which are N-channel MOSFETs (metal oxide semiconductor field effect transistors) in this embodiment example. The switches Qa and Qb have built-in body diodes Da and Db, respectively, antiparallel-connected to the switches. The drain terminal of the high side switch Qa is connected to the positive terminal of a DC power supply Ed; the source terminal of the switch Qa is connected to the drain terminal of the low side switch Qb; and the source terminal of the switch Qb is connected to the negative terminal of the DC power supply Ed. The high side switch Qa and the low side switch Qb are connected in series to form a switching circuit. The DC power supply Ed can be provided by rectifying and smoothing the commercial AC power.

The connection point between the high side switch Qa and the low side switch Qb is connected to one terminal of the primary winding P1 of a transformer T1, and the other terminal of the primary winding P1 is connected to one terminal of a resonant oscillation capacitor Cr. The other terminal of the resonant oscillation capacitor Cr is connected to the source terminal of the switch Qb and the negative terminal of the DC power supply Ed. A series connected resonant oscillation circuit is formed with the resonant oscillation capacitor Cr and a leakage inductance in the primary side of the transformer T1. The transformer T1 has an auxiliary winding P2 in the primary side of the transformer T1.

The transformer T1 comprises two secondary windings S1 and S2 that are connected in series to each other. One terminal of the secondary winding S1 is connected to the cathode terminal of a diode D1 and one terminal of the secondary winding S2 is connected to the cathode terminal of a diode D2. The anode terminals of the diodes D1 and d2 are connected to each other and grounded. The center tap of the windings in the secondary side, the connection point between the secondary windings S1 and S2, is connected to the positive terminal of a smoothing capacitor Co. The negative terminal of the smoothing capacitor Co is grounded. A full wave rectifying and smoothing circuit is formed with the diodes D1 and D2 and the smoothing capacitor Co, and forms an output circuit of the switching regulator that outputs an output voltage Vo. A load Ro is connected to this output circuit.

The switching regulator comprises circuits of performing ON-OFF control of the switching Qa and Qb based on the output voltage Vo, the circuits including an error amplifier circuit 1, a voltage controlling oscillator circuit 2, a controller circuit 3, and a driver circuit 4. The switching regulator further comprises a differentiation detecting circuit 5 and a dead time adjusting circuit 6 for adjusting dead time for the switches Qa and Qb based on the signal Vp2 from the auxiliary winding P2.

The switching regulator of this construction monitors change of the voltage Vs between the switches Qa and Qb, which is the voltage Vs at the connection point of the switch Qa and the switch Qb, using the auxiliary winding P2 provided in the transformer T1. Strictly speaking, the auxiliary winding P2 monitors the voltage across the primary winding P1 of the transformer T1, which is equal to the voltage Vs minus the electric potential at the connection point of the P1 and the Cr. Nevertheless, when the resonant oscillation current is transferred from one of the diodes Da and Db to the other, the change of the potential at the connection point of the P1 and the Cr is negligibly slow, whereas the voltage Vs changes rapidly. Therefore, the auxiliary winding P2 monitors virtually the change of the voltage Vs.

When the resonant oscillation current is flowing in the direction in which the body diode Da is in the ON state and the body diode Db is in the OFF state, the voltage Vs approximately equal to the voltage Vi of the DC power supply Ed because of the ON state of the body diode Da. Then the direction of the resonant oscillation current is reversed, the body diode Da turns OFF and the voltage Vs rapidly decreases while the resonant oscillation current discharging the floating capacitance between the switch Qa and the switch Qb. When the voltage Vs decreases to the voltage lower than the ground potential by the forward drop of the diode, the body diode Db turns ON and the voltage Vs stays in the state nearly at the ground potential. When the resonant oscillation current is reversed again, the body diode Db turns OFF and the floating capacitance is charged by the resonant oscillation current to increase the voltage Vs rapidly up to a value that make the body diode Da turn ON.

The differentiation detecting circuit 5 detects a reversal start timing or a reversal end timing of the signal Vp2 out of the auxiliary winding P2. The dead time adjusting circuit 6 generates a signal On_trg that turns ON the switch Qa or the switch Qb after a predetermined delay time from the reversal start timing or the reversal end timing of the signal Vp2. As a consequence, a necessary dead time is ensured from the moment of turn OFF of one of the switches Qa and Qb to the moment of turn ON of the other switch. Therefore, hard switching and short-circuit current are suppressed. The following describes the construction of the embodiment of the switching regulator more in detail.

Figure 2:
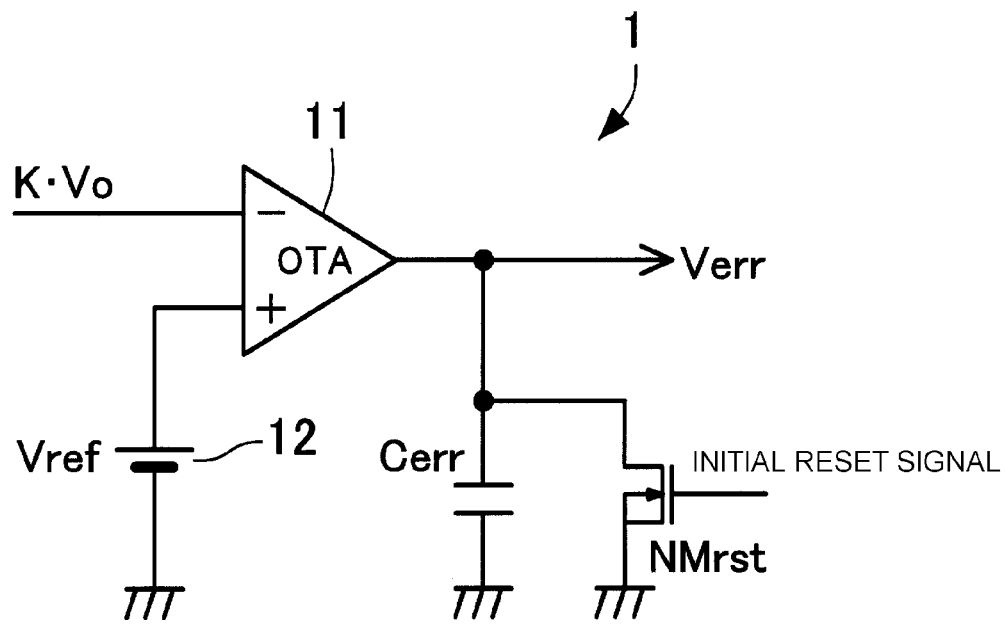
FIG. 2 is a circuit diagram showing a construction example of an error amplifier circuit in an embodiment according to embodiments the invention.
Figure 3:
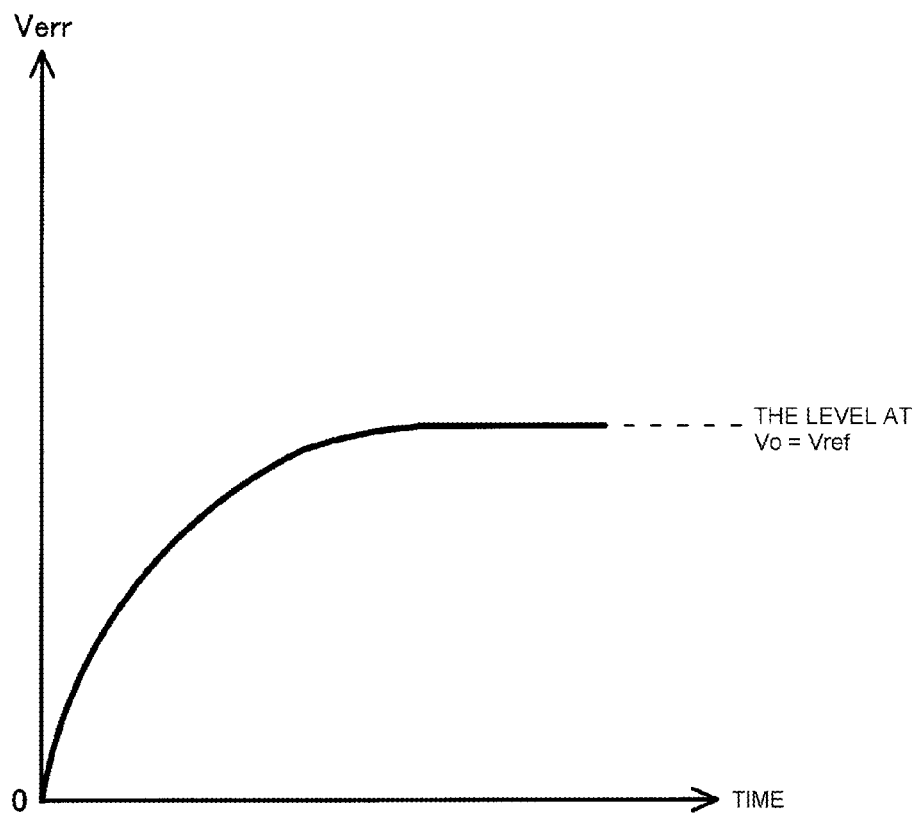
FIG. 3 shows an output characteristic of the error amplifier circuit, according to embodiments of the invention.
Figure 4:
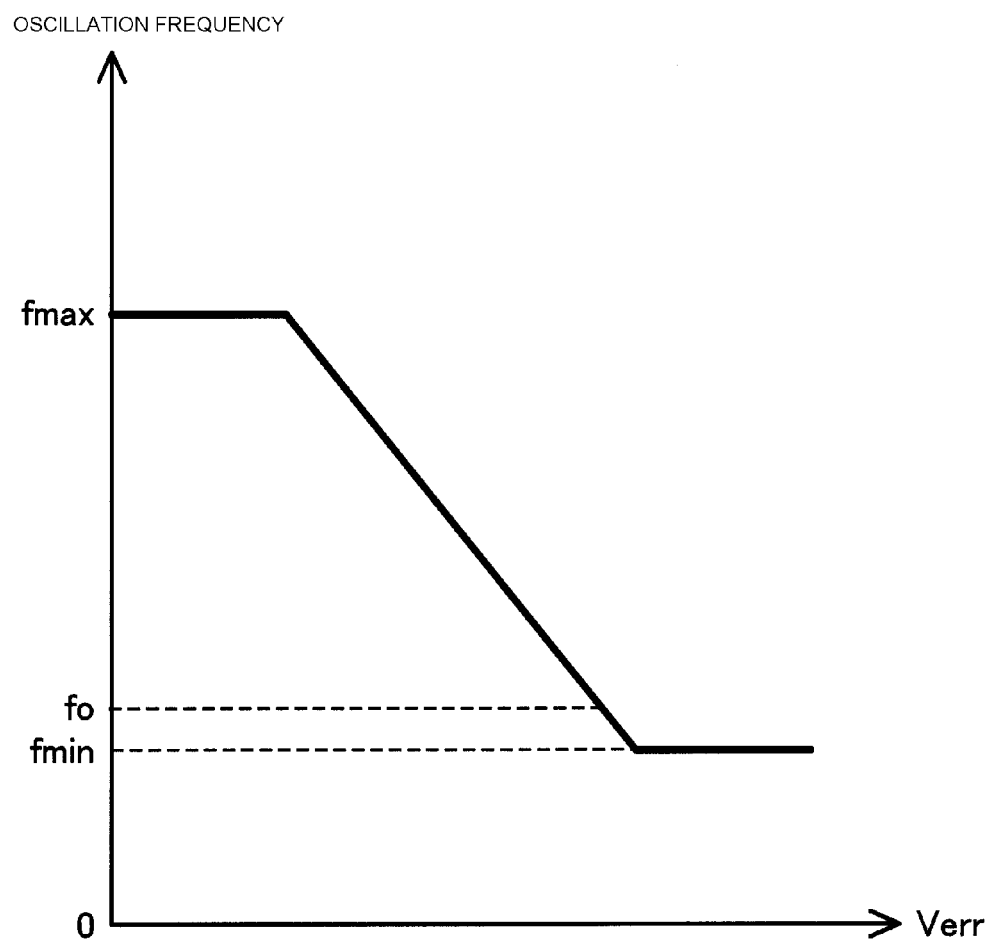
FIG. 4 shows a frequency characteristic of a voltage controlling oscillator circuit in an embodiment according to the invention.

FIG. 2 is a circuit diagram of an example of the error amplifier circuit 1; FIG. 3 shows an output characteristic of the error amplifier circuit 1; and FIG. 4 shows a frequency characteristic of the voltage controlling oscillator circuit (VCO) 2.

The error amplifier circuit 1 as shown in FIG. 2 comprises an operational transconductance amplifier (OTA) 11 that receives a differential input voltage and converts it into a current. The inversion input terminal of the OTA 11 receives the output voltage Vo or a divided voltage thereof; and the non-inversion terminal receives a reference voltage Vref from a reference voltage source 12. The output terminal of the OTA 11 is connected to one terminal of a capacitor Cerr, the other terminal of the capacitor Cerr being connected to the ground. The output terminal of the OTA 11 is also connected to the drain terminal of an N-channel MOS transistor NMrst. The source terminal of this transistor NMrst is grounded and the gate terminal thereof is connected to the output terminal of an initial reset signal generating circuit (not shown).

In the error amplifier circuit 1, the OTA 11 compares the output voltage Vo or a divided voltage K Vo (where K is a constant equal to or less than one) with the reference voltage Vref and delivers a current corresponding to the difference voltage equal to Vref−K Vo to charge the capacitor Cerr. When the voltage difference Vref−K Vo is negative, this current is also genitive to discharge the capacitor Cerr. At the time of start-up of the switching regulator, an initial reset signal is given to the gate terminal of the transistor NMrst to turn it ON. As a result, the voltage across the capacitor Cerr, which is the output voltage Verr of the error amplifier circuit 1, is cleared to a null initial value.

The output voltage Verr as shown in FIG. 3 rises from the initial value zero until the input voltage K Vo to the OTA 11 reaches the reference voltage Vref where the output voltage Verr is saturated and settled at that voltage.

The voltage controlling oscillator circuit (VCO) 2 receives the output voltage Verr from the error amplifier circuit 1 and has a frequency characteristic varying in the range from the maximum value fmax and the minimum value fmin as shown in FIG. 4 corresponding to the variation of the output voltage Verr. The voltage controlling oscillator circuit (VCO) 2 generates oscillation at a frequency much higher than the resonant oscillation frequency fo of the series-connected resonant oscillation circuit when the output voltage Verr is relatively small, and at lower frequencies with increase of the output voltage Verr. The voltage controlling oscillator circuit (VCO) 2 also receives a signal On_trg, which is a basic timing signal for perform oscillation, from the dead time adjusting circuit 6 and outputs a generated oscillation signal as a signal Off_trg.

Here, an operation at the time of rise up of the voltage controlling oscillator circuit (VCO) 2 is specifically described. Immediately after start up with a large magnitude of the voltage difference Vref−K Vo, a large current tends to flow from the OTA 11 to the capacitor Cerr. Nevertheless, the oscillation frequency of the voltage controlling oscillator circuit (VCO) 2 is the maximum value of fmax because the initial value of the output voltage Verr from the OTA 11 is zero. As the charging to the capacitor Cerr proceeds to increase the output voltage Verr, the oscillation frequency gradually decreases.

At the time the equality Vref=K Vo is reached, the output voltage Verr from the OTA 11 becomes a stable constant value; and the oscillation frequency of the voltage controlling oscillator circuit (VCO) 2 is also becomes a stable constant value. After that, if the output voltage Vo of the switching regulator decreases to a condition Vref>K Vo, the output voltage Verr of the OTA 11 increases and the oscillation frequency of the voltage controlling oscillator circuit (VCO) 2 is lowered. This condition increases the energy that is transferred from the primary side to the secondary side of the transformer T1, and raises the output voltage Vo of the switching regulator. On the contrary, if the output voltage Vo of the switching regulator increases to a condition Vref<K Vo, the output voltage Verr of the OTA 11 decreases and the oscillation frequency of the voltage controlling oscillator circuit (VCO) 2 is heightened. This condition decreases the energy that is transferred from the primary side to the secondary side of the transformer T1, and lowers the output voltage Vo of the switching regulator. Thus, the oscillation frequency of the voltage controlling oscillator circuit (VCO) 2 is feed-back-controlled toward the condition Vref=K Vo responding to the variation of the output voltage Vo of the switching regulator.

In the start-up period of the switching regulator, the output voltage Verr from the OTA 11 is small and the resulting oscillation frequency of the voltage controlling oscillator circuit (VCO) 2 is high. Consequently, the energy transferred from the primary side to the secondary side of the transformer T1 is small and the output voltage Vo of the switching regulator increases gradually. Thus, a soft start operation is achieved, eliminating a need for a circuit dedicated to the soft start operation.

Figure 5:
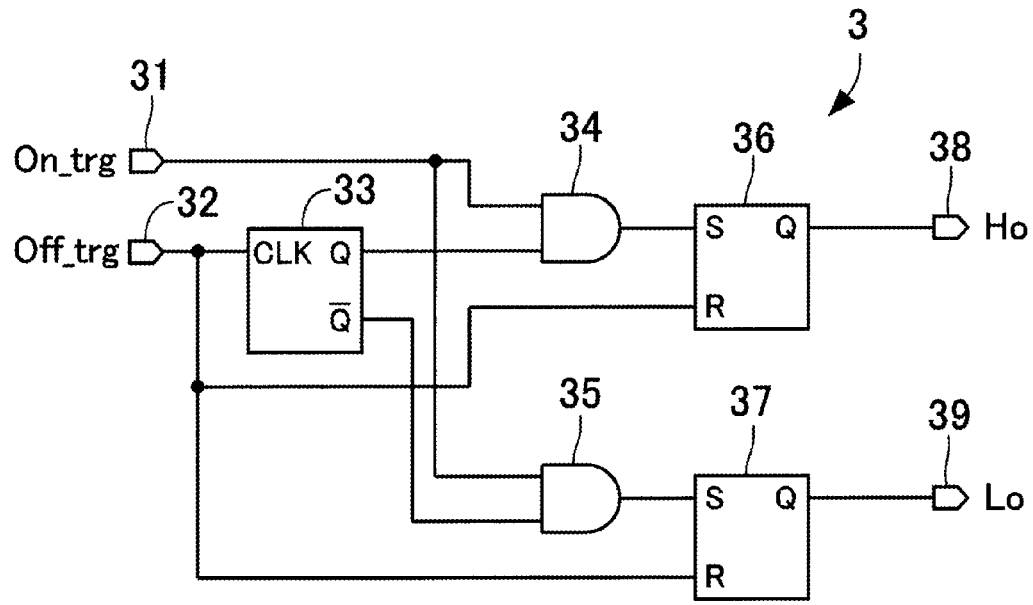
FIG. 5 is a circuit diagram showing a construction example of a controller circuit in an embodiment according to the invention.
Figure 6:
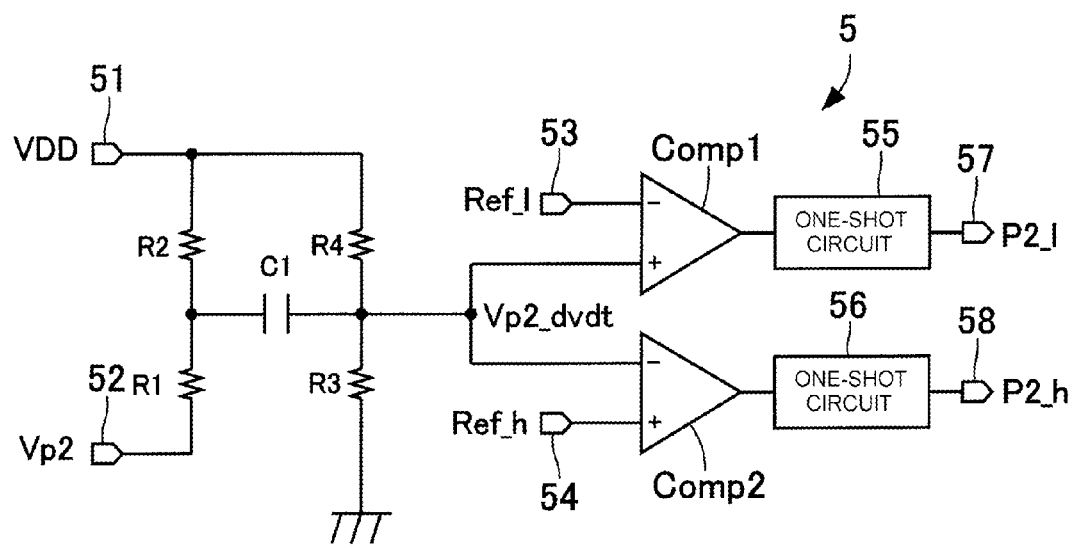
FIG. 6 is a circuit diagram showing a construction example of a differentiation detecting circuit in an embodiment according to the invention.
Figure 7:
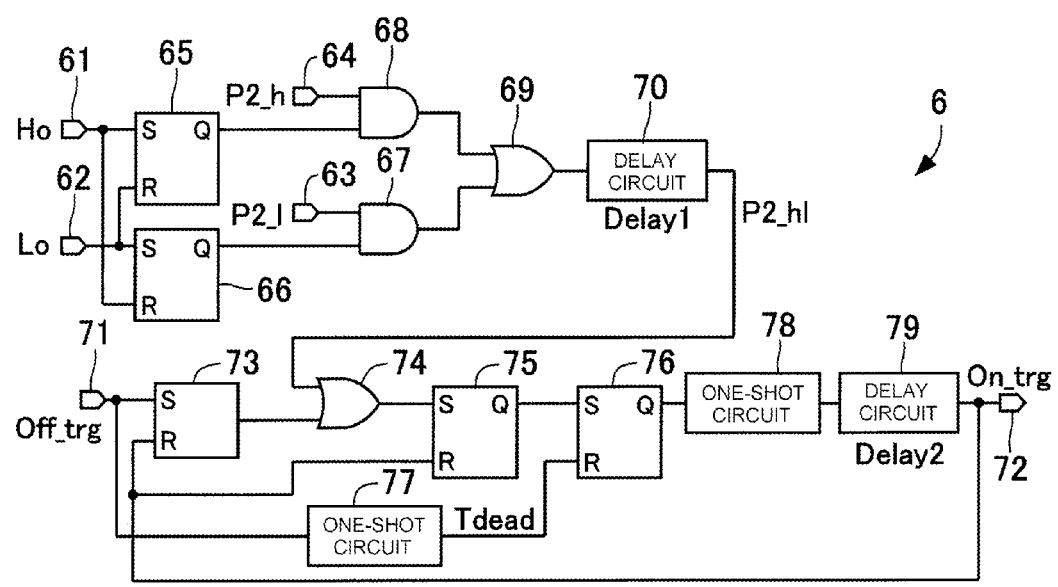
FIG. 7 is a circuit diagram showing a construction example of a dead time adjusting circuit in an embodiment according to the invention.

FIG. 5 is a circuit diagram showing a construction example of the controller circuit 3; FIG. 6 is a circuit diagram showing a construction example of the differentiation detecting circuit 5; and FIG. 7 is a circuit diagram showing a construction example of the dead time adjusting circuit 6.

The controller circuit 3 as shown in FIG. 5 comprises: two input terminals 31 and 32; T flip-flop 33; two AND gates 34 and 35; two reset priority RS flip-flops 36 and 37; and two output terminals 38 and 39. The T flip-flop 33 has a terminal connected to the input terminal 32 that receives the signal Off_trg, an output terminal Q that is connected to one input terminal of the AND gate 34, and an inverted output terminal that is connected to one input terminal of the AND gate 35. The other terminal of the AND gate 34 and the other terminal of the AND gate 35 are both connected to the input terminal 31 that receives the signal On_trg. The output terminal of the AND gate 34 is connected to the set input terminal of the RS flip-flop 36 and the output terminal of the AND gate 35 is connected to the set input terminal of the RS flip-flop 37. The reset input terminal of the RS flip-flop 36 and the reset input terminal of the RS flip-flop 37 are both connected to the input terminal 32. The output terminal Q of the flip-flop 36 is connected to the output terminal 38 delivering a signal Ho, and the output terminal Q of the flip-flop 37 is connected to the output terminal 39 delivering a signal Lo.

The controller circuit 3 receives the signal Off_trg from the voltage controlling oscillator circuit (VCO) 2 and the signal On_trg from the dead time adjusting circuit 6, and generates the signals Ho and Lo and delivers them to the driver circuit 4. The driver circuit 4 has output terminals that are connected to the gate terminal of the switch Qa and the gate terminal of the switch Qb. The driver circuit 4 generates a signal for driving the switch Qa from the received signal Ho and a signal for driving the switch Qb from the received signal Lo, to drive switching operation of the switches Qa and Qb.

The differentiation detecting circuit 5 as shown in FIG. 6 has a Vdd terminal 51 that receives power supply, an input terminal 52 that is connected to the auxiliary winding P2 of the transformer T1, and a differentiation circuit including resistances R1 through R4 and a capacitor C1. The capacitor C1 and the resistances R3 and R4 provide a function to differentiate the signal Vp2 delivered to the input terminal 52. The resistances R1 and R2 provide a function to level-shift the signal Vp2, which can be a negative voltage, to a positive value at all times. The input terminal 52 is connected to the Vdd terminal through the series-connected resistances R2 and R1 that have the same resistance value. The connection point of the resistances R1 and R2 is connected to one terminal of the capacitor C1. Thus, the signal Vp2 that varies on both sides of the ground potential is level-shifted to a signal varying around the potential of VDD/2 and delivered to the one terminal of the capacitor C1. This construction allows operating a controller circuit of a semiconductor integrated circuit that does not have a negative power supply and does not deal with a negative voltage signal. The Vdd terminal 51 is also connected to the ground through the series-connected resistances R3 and R4 that have the same resistance value. The connection point of the resistances R3 and R4 is connected to the other terminal of the capacitor C1. The resistances R3 and R4 together with the capacitor C1 form a differentiating circuit and the connection point of the resistances R3 and R4 outputs a signal Vp2_dvdt that is a differentiated signal of the detected signal Vp2. Because of the equal resistances R3 and R4, the signal Vp2_dvdt varies around the potential VDD/2.

The differentiation detecting circuit 5 further comprises: two comparators Comp1 and Comp2; input terminals 53 and 54; one-shot circuits 55 and 56; and output terminals 57 and 58. The comparator Comp1 has an inverting input terminal connected to the input terminal 53 that receives a threshold value Ref_l and a non-inverting input terminal connected to the connection point of the capacitor C1, the resistor R3, and the resistor R4, the connection point being the output point of the differentiating circuit composed of the capacitor C1, the resistor R3, and the resistor R4. The output terminal of the comparator Comp1 is connected to the output terminal 57 through the one-shot circuit 55. The one-shot circuit 55 detects a front edge of rising up of the output signal from the comparator Comp1 showing that the output signal from the differentiating circuit has exceeded the threshold value Ref_l and outputs a signal P2_l with a predetermined pulse width for example, 50 ns. The comparator Comp2 has a non-inverting input terminal connected to the input terminal 54 that receives a threshold value Ref_h and an inverting input terminal connected to the connection point of the capacitor C1, the resistor R3, and the resistor R4. The output terminal of the comparator Comp2 is connected to the output terminal 58 through the one-shot circuit 56. The one-shot circuit 56 detects a front edge of rising up of the output signal from the comparator Comp2 showing that the output signal from the differentiating circuit has decreased below the threshold value Ref_h and outputs a signal P2_h with a predetermined pulse width for example, 50 ns. The threshold value Ref_l is set at a value at the middle between the voltage VDD and the half of the VDD, and the threshold value Ref_h is set at a value at the middle between the half of the VDD and the ground potential.

The differentiation detecting circuit 5 receives the signal Vp2 generated by the auxiliary winding P2 of the transformer T1. The winding ratio of the primary winding P1 to the auxiliary winding P2 of the transformer T1 is about 100, for example. Therefore, the differentiation detecting circuit 5 receiving the signal Vp2 can be constructed of a low voltage circuit that does not require any high voltage circuit elements.

The dead time adjusting circuit 6 has the input terminals 61 and 62 to receive the signals Ho and Lo, respectively, generated by the controller circuit 3, and the input terminals 63 and 64 that receive the signals P2_l and P2_h, respectively, detected by the differentiation detecting circuit 5. The dead time adjusting circuit 6 includes a circuit that holds the signals Ho and Lo, and combines the signals Ho and Lo and the signals P2_l and P2_h, and outputs a delayed common signal P2_hl. This circuit comprises reset-priority RS flip-flops 65 and 66, AND gates 67 and 68, an OR gate 69, and a delay circuit 70. The input terminal 61 is connected to the set input terminal of the RS flip-flop 65 and the reset input terminal of the RS flip-flop 66; the input terminal 62 is connected to the set input terminal of the RS flip-flop 66 and the reset input terminal of the RS flip-flop 65. The output terminal of the RS flip-flop 66 is connected to one terminal of the AND gate 67 and the other input terminal of the AND gate 67 is connected to the input terminal 63. The output terminal of the RS flip-flop 65 is connected to one terminal of the AND gate 68 and the other input terminal of the AND gate 68 is connected to the input terminal 64. The output terminals of the AND gates 67 and 68 are connected to the input terminals of the OR gate 69, and the output terminals of the OR gate 69 is connected to the input terminal of the delay circuit 70 that has a delay time Delay1. The delay time Delay1 is set at about 200 ns, for example.

The dead time adjusting circuit 6 has an input terminal 71 that receives the Off_trg from the voltage controlling oscillator circuit (VCO) 2, an output terminal 72 that outputs the signal On_trg to the voltage controlling oscillator circuit (VCO) 2 and to the controller circuit 3, and a circuit for adjusting dead time. This circuit comprises a timer 73, an OR gate 74, reset-priority RS flip-flops 75 and 76 that are signal holding circuits, one-shot circuits 77 and 78, and a delay circuit 79. The input terminal 71 is connected to the set input terminal of the timer 73; the reset input terminal of the timer 73 is connected to the output terminal 72; and the output terminal of the timer 73 is connected to one input terminal of the OR gate 74. The timer 73, on receiving a set input signal, starts counting for about 20 µs. If no reset input is given during the counting period, the timer 73 delivers a high level output signal after the maximum dead time, which is set to be about 20 µs in this example, has expired. The other input terminal of the OR gate 74 is connected to the output terminal of the delay circuit 70, and the output terminal of the OR gate 74 is connected to the set input terminal of the RS flip-flop 75. The reset input terminal of the RS flip-flop 75 is connected to the output terminal 72, and the output terminal of the RS flip-flop 75 is connected to the set input terminal of the RS flip-flop 76. The input terminal 71 is also connected to the input terminal of the one-shot circuit 77 that is a minimum dead time setting circuit, and the output terminal of the one-shot circuit 77 is connected to the reset terminal of the RS flip-flop 76. This one-shot circuit 77 sets a minimum dead time signal Tdead, for example about 300 ns, which must be waited before delivering a signal On_trg after receiving a signal Off_trg. The output terminal of the RS flip-flop 76 is connected to the input terminal of the one-shot circuit 78 that is a signal conversion circuit, and the output terminal of the one-shot circuit 78 is connected to the input terminal of the delay circuit 79 having a delay time Delay2. The delay time Delay2 is set to be about 50 ns, in this example.

The following describes operation of the switching regulator constructed as described above when the oscillation frequency of the voltage controlling oscillator circuit (VCO) 2 is a very high value near the maximum value fmax, which is the case in the light load period, at the start up time, and immediately after change of a target voltage. Since the switching frequency is much higher than the resonance frequency of the resonance oscillating circuit, the variation of the voltage across the capacitor Cr is negligibly small in one switching period. Consequently, the variation of the voltage Vs can be detected directly by the signal Vp2 from the auxiliary winding P2. The normal mode here means a stable resonant oscillation state, in which the voltage across the resonant oscillation capacitor Cr averaged over one period is equal to the half of the voltage Vi of the DC power supply Ed. The short-circuit current mode means a state out of the stable resonant oscillation state and hard switching or short-circuit current possibly occurs.

Figure 8:
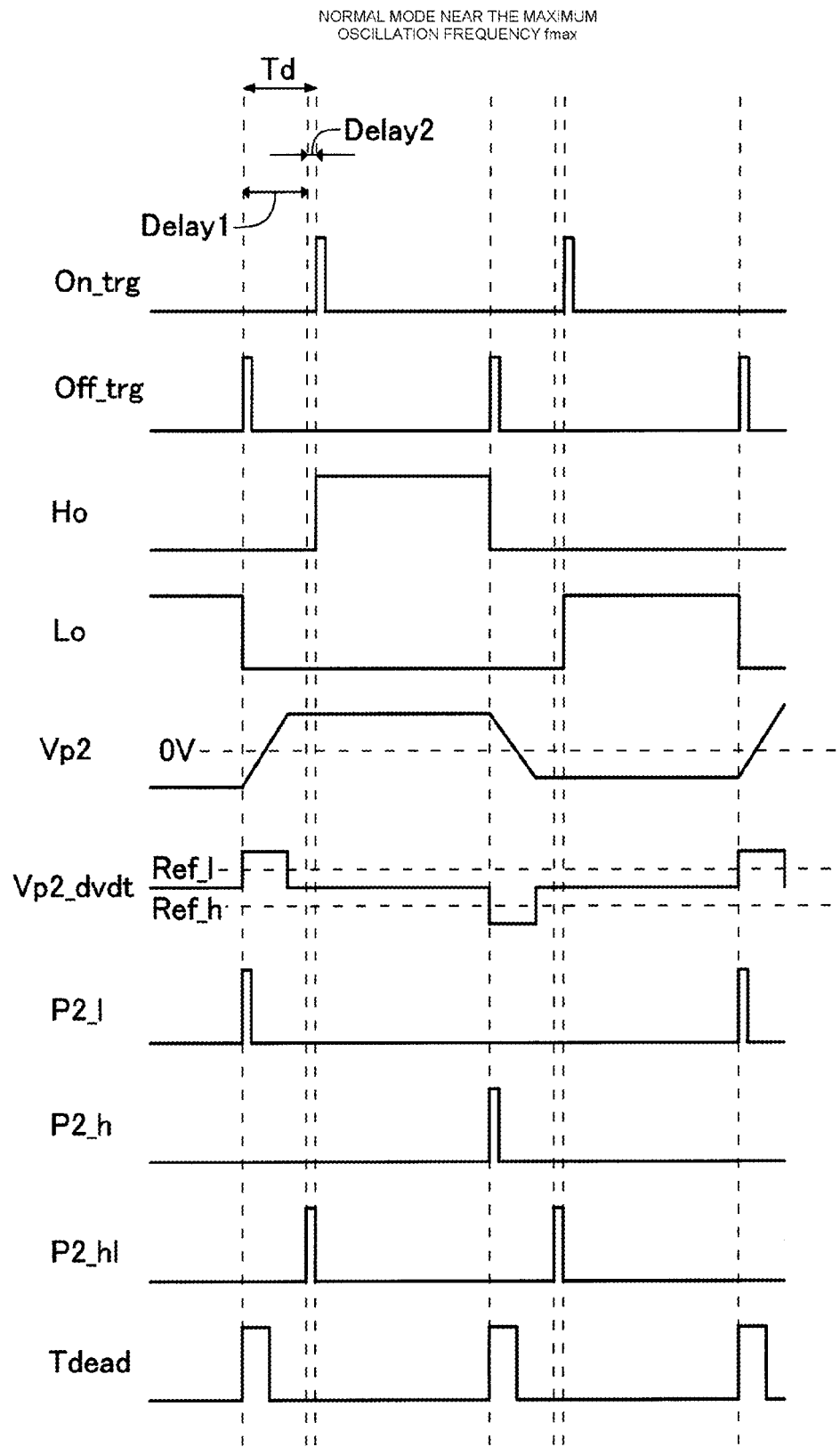
FIG. 8 is a timing chart showing significant waveforms in the normal mode near the maximum oscillation frequency.
Figure 9:
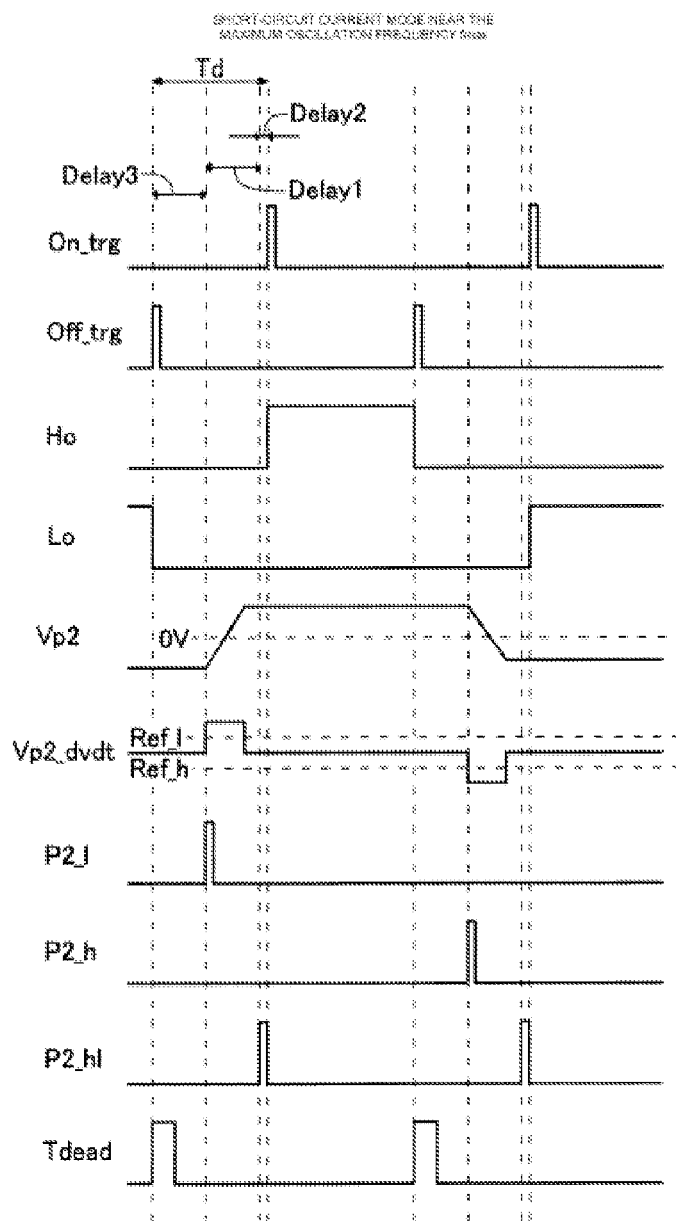
FIG. 9 is a timing chart showing significant waveforms in the short-circuit current mode near the maximum oscillation frequency.

FIG. 8 is a timing chart showing significant waveforms in the normal mode near the maximum oscillation frequency, and FIG. 9 is a timing chart showing significant waveforms in the short-circuit current mode near the maximum oscillation frequency. FIGS. 8 and 9 present, from the top to the bottom, the signals On_trg and OFF_trg, the signals Ho and Lo, the signal Vp2, the signal Vp2_dvdt, the signals P2_l and P2_h, the signal P2_hl, and the minimum dead time signal Tdead.

In the normal mode as shown in FIG. 8, the signals Ho and Lo to drive the switches Qa and Qb ON and OFF are generated based on the signals On_trg and OFF_trg. The signal Vp2 is generated by switching of the switches Qa and Qb. The signal Vp2 has a magnitude approximately proportional to the voltage Vs between the switch Qa and the switch Qb. The direction of current changes with the resonant oscillation in the dead time, and the signal Vp2 changes remarkably during transfer of the resonant oscillation current between the body diode Da and the body diode Db. Of the changes in the signal Vp2, the differentiation detecting circuit 5 first detects the change during rise up of the signal Vp2, and then detects the change during fall down, as illustrated in FIG. 8. The differentiation detecting circuit 5 generates the signal Vp2_dvdt by differentiating the signal Vp2 through the differentiating circuit in the differentiation detecting circuit 5. Then, the comparator Comp1 compares the signal Vp2_dvdt with the threshold value Ref_l. When the signal Vp2_dvdt exceeds the threshold value Ref_l, the comparator Comp1 outputs a high level signal. The one-shot circuit 55 detects the timing of the front edge of rise up of the signal Vp2_dvdt from the front edge of rise up of the output of the comparator Comp1, and delivers the signal P2_l with a predetermined pulse width. After that, the comparator Comp2 compares the signal Vp2_dvdt with the threshold value Ref_h. When the signal Vp2_dvdt decreases below the threshold value Ref_h, the comparator Comp2 outputs a high level signal. The one-shot circuit 56 detects the timing of the front edge of fall down of the signal Vp_dvdt from the front edge of rise up of the output of the comparator Comp2, and delivers the signal P2_h with a predetermined pulse width. Thus, the differentiation detecting circuit 5 detects the timing of the front edge of the signal Vp2_dvdt, which is the timing of start of reversal of the signal Vp2.

A situation is assumed in which the signal Lo that drives the low side switch Qb turns OFF from an ON state upon receiving the signal OFF_trg that triggers turning OFF of the switch Qa or the switch Qb. Here, the wording 'turn OFF of the signal Lo' means that the signal Lo changes from a state for turning ON the switch Qb to a state for turning OFF the switch Qb. At this time in the dead time adjusting circuit 6, the state of the RS flip-flop 66 remains unchanged in the state that has been set during the ON state of the signal Lo. Consequently, the signal P2_l received at the input terminal 63 is transferred through the AND gate 67 and the OR gate 69 to the delay circuit 70 which in turn outputs a signal P2_hl delayed by a delay time Delay1. This signal P2_hl is transferred through the OR gate 74 and the RS flip-flops 75 and 76, and enters the one-shot circuit 78 that converts the signal P2_hl to a signal with a predetermined pulse width. This pulse signal enters the delay circuit 79 where the signal is delayed by a delay time Delay2. Then, a signal On_trg is delivered to trigger turning ON of the switch Qa or switch Qb. When this signal On_trg is given to the controller circuit 3, a signal Ho is delivered at that timing to turn ON the high side switch Qa, and at the same time, the RS flip-flop 66 is reset.

In the similar way, when the ON and OFF states of the switch Qa and the switch Qb are exchanged and a signal Off_trg is delivered to turn OFF the high side switch Qa, the signal Vp2 falls down corresponding to the voltage Vs between the switch Qa and the switch Qb in a dead time. This fall down of the signal Vp2 is detected by the comparator Comp2 in the differentiation detecting circuit 5 and a signal P2_h is delivered. The signal P2_h enters the dead time adjusting circuit 6, and is delayed in the delay circuit 70 to give a signal P2_hl, which is further delayed in the delay circuit 79 to give a signal On_trg. This signal On_trg turns ON the low side switch Qb.

Thus, the signal On_trg is delivered only after a predetermined time has passed from the output of the signal Off_trg from the voltage controlling oscillation circuit 2 and detection of start of change in the signal Vp2. In the normal mode, the timing of the signal Off_trg and the timing of change of the signal Vp2 are approximately simultaneous. Consequently, the signal On_trg is delivered after a dead time Td that is the sum of the delay time Delay1 and the delay time Delay2.

In the dead time adjusting circuit 6, the one-shot circuit 77 delivers a minimum dead time signal Tdead responding to the signal Off_trg and resets the RS flip-flop 76. Accordingly, the RS flip-flop 76, with the reset state in preference during the period of the minimum dead time signal Tdead, does not read and hold the signal P2_hl, and thus, does not deliver a signal On_trg. Because sufficient dead time is ensured, occurrence of hard switching and short-circuit current is completely inhibited.

Then, the operation in the short-circuit current mode is described in the following. FIG. 9 indicates delay of the rise up timing of the signal Vp2 detected by the auxiliary winding P2 of the transformer T1. Because in the startup time, the resonant oscillation capacitor Cr needs to be charged from zero volts, the resonant oscillation capacitor Cr has not been charged up to a sufficient voltage yet when the low side switch Qb turns OFF. As a result, it takes time to perform current transfer between the body diode Da and the body diode Db. Since the oscillation frequency is set at a much higher value than the resonant oscillation frequency fo in the startup time, the current for charging the resonant oscillation capacitor Cr is small and thus it take time to the charging process. Besides the time of startup of the switching regulator, this phenomenon is also apt to occur in rapid change in a load condition and immediately after change of a target voltage. In these cases, too, the voltage across the resonant oscillation capacitor Cr is not appropriate and the current transfer between the body diode Da and the body diode Db takes certain time.

The operation in the short-circuit current mode involves a delay time Delay3 from delivery of the signal Off_trg to rising up of the signal Vp2. Thus, the dead time Td is the sum of the delay time Delay1, the delay time Delay2, and the delay time Delay 3. This delay time Td is longer than that in the normal mode operation.

As can be seen from the above description, the switching regulator of some embodiments is effective in particular in the case in which the oscillation frequency of the voltage controlling oscillation circuit 2 is the maximum value fmax or approximately the maximum value. The differentiation detecting circuit 5 detects the reversal start timing of the signal Vp2 after turning OFF of one of the switch Qa and the switch Qb to confirm absence of current through the body diode in the different side with respect to the switch Qa or the switch Qb. Then, the dead time adjusting circuit 6 delivers a signal to turn ON the other switch of the switch Qa and the switch Qb after passing a predetermined delay time from the timing of detection. Consequently, a necessary dead time is ensured for current transfer between the body diode Da and the body diode Db. Therefore, occurrence of hard switching and short-circuit current is suppressed without failure.

Even when the oscillation frequency in the voltage controlling oscillation circuit 2 is lower than the maximum frequency fmax or frequencies in substantially the same condition, the signal Vp2_dvdt may yet be generated by a resonant oscillation operation of the resonant oscillation circuit, and thus generating a signal On_trg in the period out of the dead time. In that case, however, the turn ON instruction is given to the switch that is already in the ON state, and thus does not affect adversely. In this condition, when a dead time starts by the signal Off_trg, the RS flip-flop 76 in FIG. 7 is reset by the minimum dead time signal Tdead triggered by the Off_trg and delivered from the one-shot circuit 77. At the moment the minimum dead time Tdead has expired and the reset condition is released, the RS flip-flop 76 is set according to the output signal from the RS flip-flop 75 to generate an effective signal On_trg.

The following describes a variation example from the construction described above. In this variation example, the settings are changed in the one-shot circuits 55 and 56 of the differentiation detecting circuit 5, and the delay circuit 70 of the dead time adjusting circuit 6. Whereas the one-shot circuits 55 and 56 of the differentiation detecting circuit 5 in the above-described construction operate responding to the front edge of rise up of the comparators Comp1 and Comp2, the signals P2_l and P2_h in this variation are delivered responding to the rear edge of fall down of the output signal from the comparators Comp1 and Comp2. The differentiation detecting circuit 5 in the variation example detects the timing of finish of reversal of the signal Vp2 and delivers the signals P2_l and P2_h. In addition, whereas the delay circuit 70 in the dead time adjusting circuit 6 sets a delay time Delay1 of about 200 ns in the previous example, the setting of the delay time Delay1 is about 50 ns in the variation example. The following describes operation of the variation example in more in detail.

Figure 10:
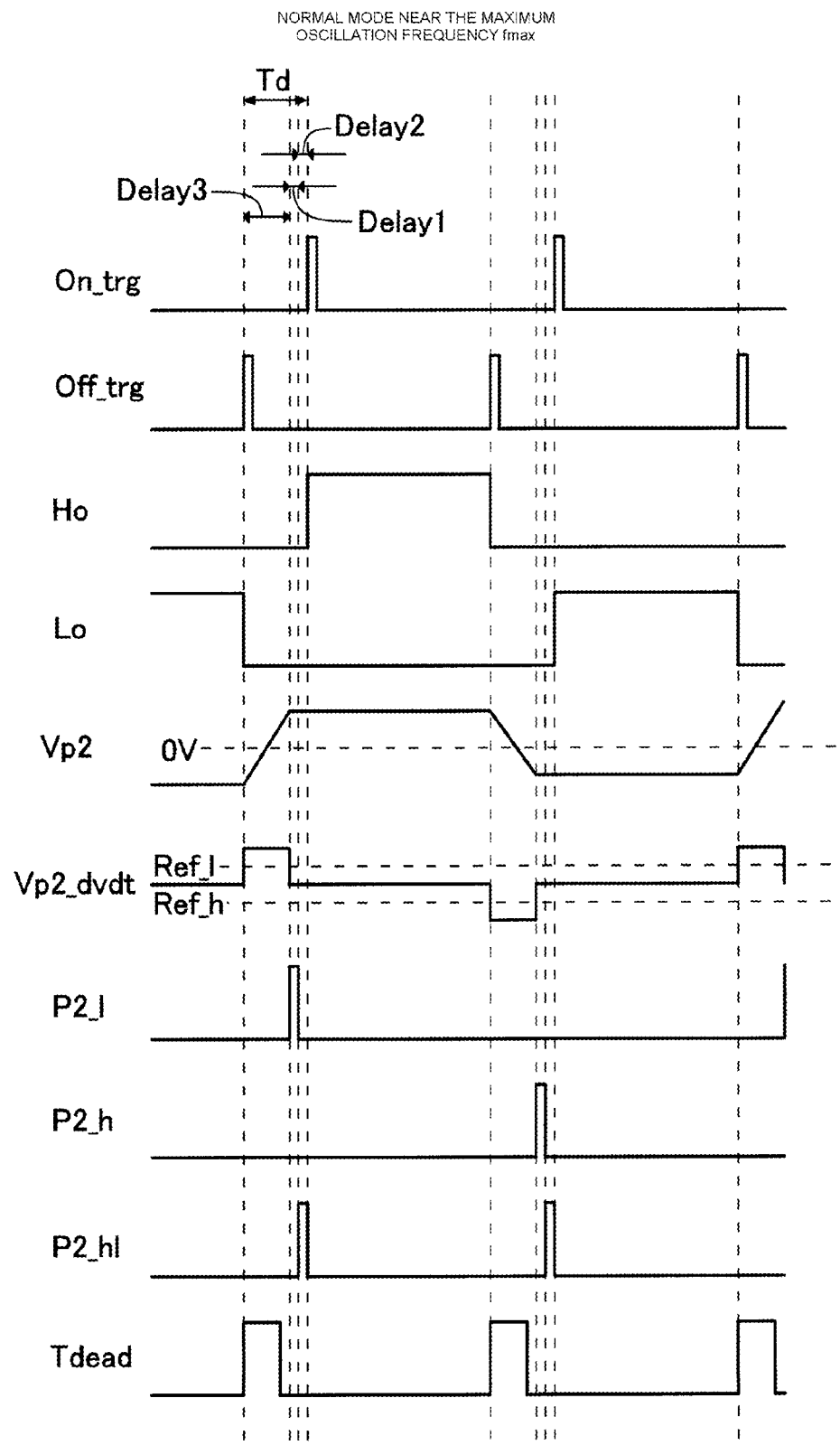
FIG. 10 is a timing chart showing significant waveforms in the normal mode near the maximum oscillation frequency in a variation according to the invention.
Figure 11:
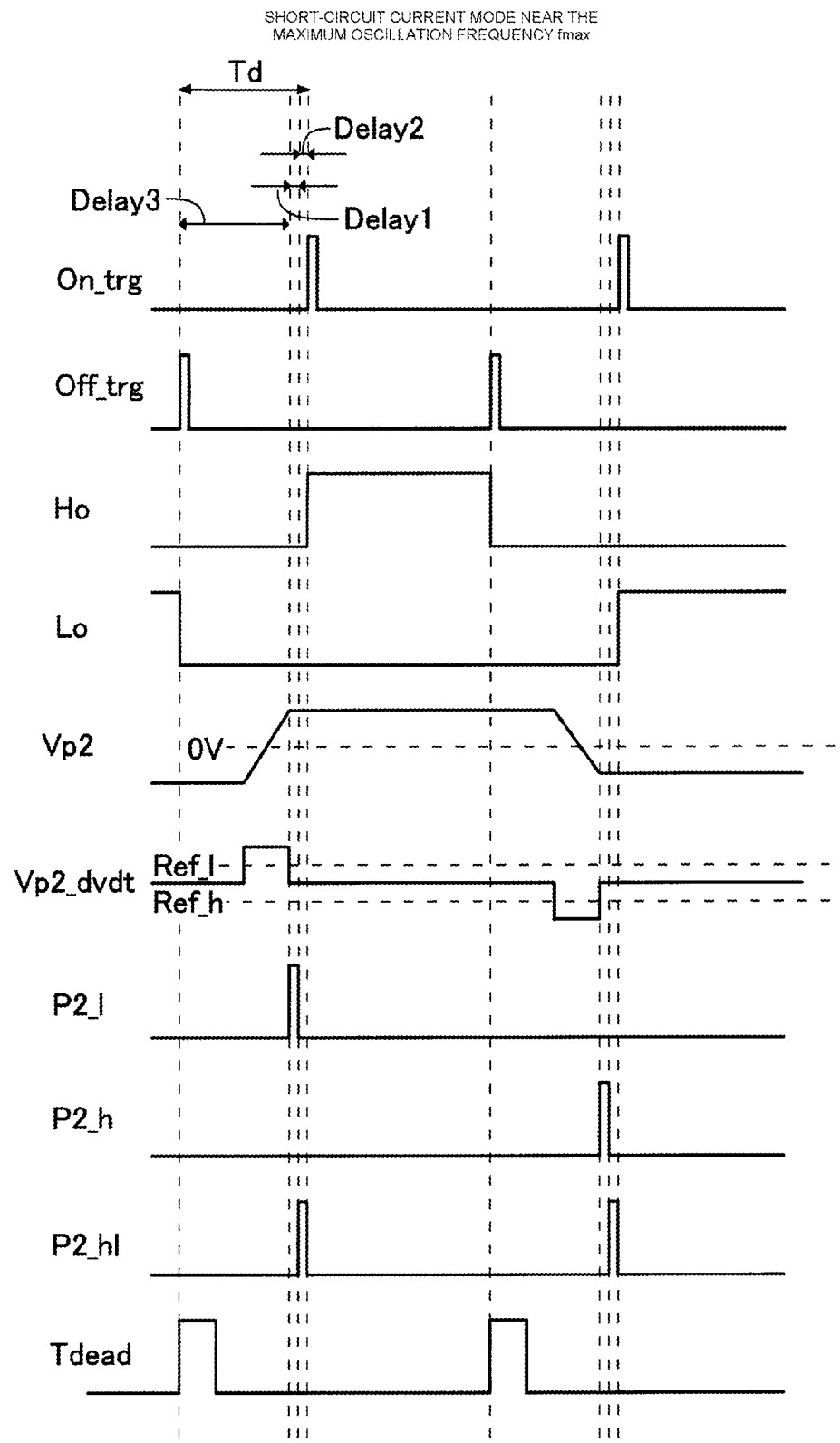
FIG. 11 is a timing chart showing significant waveforms in the short-circuit current mode near the maximum oscillation frequency in a variation according to the invention.
Figure 12:
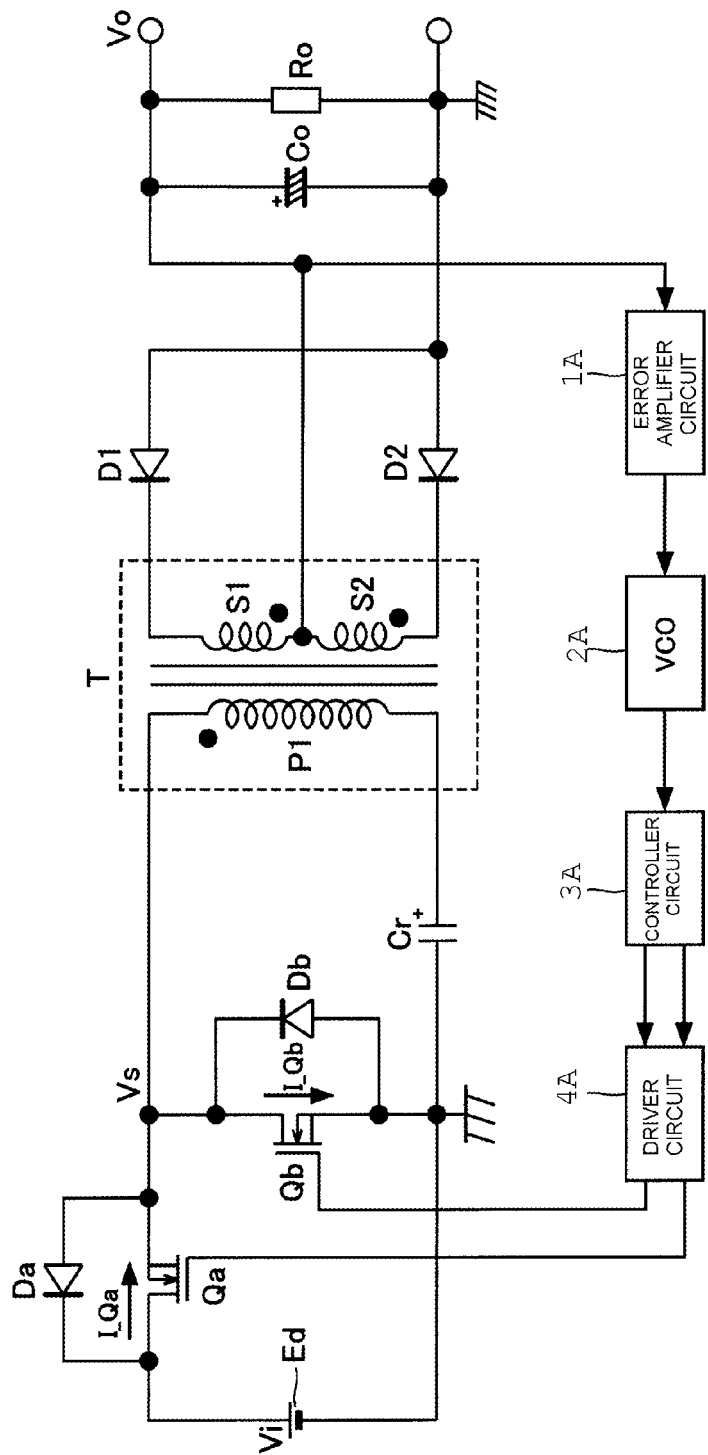
FIG. 12 shows a generally employed construction example of a switching regulator of a current resonant oscillation type.

FIG. 10 is a timing chart showing significant waveforms in the normal mode near the maximum oscillation frequency in a variation according to the invention; and FIG. 11 is a timing chart showing significant waveforms in the short-circuit current mode near the maximum oscillation frequency in a variation according to the invention. FIGS. 10 and 11 present, from the top to the bottom, the signals On_trg and OFF_trg, the signals Ho and Lo, the signal Vp2, the signal Vp2_dvdt, the signals P2_l and P2_h, the signal P2_hl, and the minimum dead time signal Tdead.

In the normal mode as shown in FIG. 10, the signals Ho and Lo to drive the switches Qa and Qb ON and OFF are generated based on the signals On_trg and OFF_trg. The signal Vp2 is generated by switching of the switches Qa and Qb. The differentiation detecting circuit 5 differentiates signal Vp2, and detects fall down at the rear edge of the signal Vp2_dvdt to deliver the signal P2_l and rise up at the rear edge of the signal Vp2_dvdt to deliver the signal P2_h.

The signals P2_l and P2_h are delayed by the delay time Delay1 in the dead time adjusting circuit 6 to generate the signal P2_hl, which is further delayed by the delay time Delay2 to generate the signal On_trg.

In the normal mode as shown in FIG. 10, the dead time Td is the sum of the delay time Delay1, the delay time Delay2, and the delay time Delay3, wherein the delay time Delay3 is the period from the timing of the signal Off_trg to the timing of the signal P2_l or the signal P2_h. The dead time Td is set to be longer than the time of reversal of the signal Vp2 due to reversal of resonant oscillation current caused by resonant oscillation operation. Therefore, hard switching and short-circuit current cannot occur.

In the short-circuit current mode as shown in FIG. 11, the timing of rise up of the signal Vp2 is later than in the case of the normal mode shown in FIG. 10. As a result, the delay time Delay3, which is the period from the timing of the signal Off_trg to the timing of the signal P2_l or the signal P2_h, is longer than that in the normal mode. Thus, the dead time Td is set to be longer than that in the normal mode. Therefore, occurrence of hard switching and short-circuit current is suppressed without failure.

The differentiation detection circuit 5 and the dead time adjusting circuit 6 are preferably integrated in a control device composed of an integrated circuit. This integrated circuit can contain the controller circuit 3, and further include the voltage controlling oscillator circuit 2 and the driver circuit 4. The error amplifier circuit 1 may also be integrated into the control device of an integrated circuit. The resonant oscillation circuit illustrated in FIG. 1 is composed of the leakage inductance in the primary side of the transformer T1 and the resonant oscillation capacitor Cr. However, a resonant oscillation inductance can be additionally connected in series to the primary winding of the transformer T1. Whereas the resonant oscillation circuit is connected in parallel to the low side switch Qb in the example of FIG. 1, the resonant oscillation circuit can be connected in parallel to the high side switch Qa.

The delay circuit 79 of the dead time adjusting circuit 6 shown in FIG. 7 is provided to obtain the signal On_trg with a time span longer than a predetermined value even though the one-shot circuit 78 is such a circuit that outputs a low level signal receiving a low level signal. The delay circuit 79, however, may be omitted when the one-shot circuit 78 has a certain appropriate construction.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2011-150974, filed on Jul. 7, 2011. The disclosure of the priority application, in its entirety, including the drawings, claims, and the specification thereof, is incorporated herein by reference.

What is claimed is:

1. A switching regulator comprising:
    series-connected first switch and second switch that are connected to terminals of a DC power supply;
    a resonant oscillation circuit connected to both terminals of the first switch or the second switch, including a resonance oscillation capacitor, at least one of a resonant oscillation inductance and a leakage inductance of a transformer, and a primary winding in a primary side of the transformer, serially connected;
    an auxiliary winding that is provided in the primary side of the transformer and detects change of a voltage across the primary winding of the transformer;
    a differentiation detecting circuit that differentiates a detection voltage detected by the auxiliary winding to detect a timing of start of reversal or a timing of end of reversal of the detection voltage; and
    a dead time adjusting circuit that generates a second trigger signal at a timing of turning ON the first switch or the second switch after a predetermined delay time from the timing detected by the differentiation detecting circuit for the start of reversal or the end of reversal of the detection voltage detected by the auxiliary winding.

2. The switching regulator according to claim 1, wherein the differentiation detecting circuit comprises:
    a differentiating circuit that delivers a differentiated signal of the detection voltage;
    a first comparator that compares the differentiated signal with a first threshold value;
    a second comparator that compares the differentiated signal with a second threshold value smaller than the first threshold value;
    a first one-shot circuit that detects a front edge of an output signal from the first comparator indicating that the differentiated signal is larger than the first threshold value, and delivers a first reversal start signal; and
    a second one-shot circuit that detects a front edge of an output signal from the second comparator indicating that the differentiated signal is smaller than the second threshold value, and delivers a second reversal start signal.

3. The switching regulator according to claim 1, wherein the differentiation detecting circuit comprises:
    a differentiating circuit that delivers a differentiated signal of the detection voltage;
    a first comparator that compares the differentiated signal with a first threshold value;
    a second comparator that compares the differentiated signal with a second threshold value smaller than first the threshold value;
    a first one-shot circuit that detects a rear edge of an output signal from the first comparator indicating that the differentiated signal is larger than the first threshold value, and delivers a first reversal end signal; and
    a second one-shot circuit that detects a rear edge of an output signal from the second comparator indicating that the differentiated signal is smaller than the second threshold value, and delivers a second reversal end signal.

4. The switching regulator according to claim 2, wherein the dead time adjusting circuit comprises:
    a delay circuit that delays a first reversal start signal and a second reversal start signal, or a first reversal end signal and a second reversal end signal;
    a minimum dead time setting circuit that receives a first trigger signal and delivers a minimum dead time signal;
    a signal holding circuit that is reset in a period the minimum dead time signal is delivered, and is set and holds the set state in a condition that the minimum dead time signal is released and the delay by the delay circuit is terminated; and
    a signal conversion circuit that converts the held set state of the signal holding circuit into a signal with a predetermined pulse width to obtain the second trigger signal.

5. The switching regulator according to claim 3, wherein the dead time adjusting circuit comprises:
    a delay circuit that delays the first reversal start signal and the second reversal start signal, or the first reversal end signal and the second reversal end signal;
    a minimum dead time setting circuit that receives a first trigger signal and delivers a minimum dead time signal;
    a signal holding circuit that is reset in a period the minimum dead time signal is delivered, and is set and holds the set state in a condition that the minimum dead time signal is released and the delay by the delay circuit is terminated; and a signal conversion circuit that converts the held set state of the signal holding circuit into a signal with a predetermined pulse width to obtain the second trigger signal.

6. The switching regulator according to claim 4, wherein the dead time adjusting circuit comprises a timer circuit that starts counting on receiving the first trigger signal, stops counting on receiving the second trigger signal, and delivers a signal to set the signal holding circuit when a period of the maximum dead time has passed since the start of counting.

7. A control device of a switching regulator for controlling a switching regulator, the switching regulator comprising:
   series-connected first switch and second switch that are connected to terminals of a DC power supply; and
   a resonant oscillation circuit connected to both terminals of the first switch or the second switch, including a resonance oscillation capacitor, at least one of a resonant oscillation inductance and a leakage inductance of a transformer, and a primary winding in a primary side of the transformer, serially connected;
   the control device comprising:
   a differentiation detecting circuit that differentiates a detection voltage detected by an auxiliary winding that is provided in the primary side of the transformer, to detect a timing of start of reversal or a timing of end of reversal of the detection voltage; and
   a dead time adjusting circuit that generates a second trigger signal at a timing of turning ON the first switch or the second switch after a predetermined delay time from the timing detected by the differentiation detecting circuit for the start of reversal or the end of reversal of the detection voltage detected by the auxiliary winding.

8. The control device of a switching regulator according to claim 7, the control device further comprising a controller circuit that receives a first trigger signal and the second trigger signal that is generated by the dead time adjusting circuit and generates a signal to drive the first switch or the second switch.

9. The control device of a switching regulator according to claim 8, the control device further comprising: a voltage controlling oscillation circuit that generates the first trigger signal and delivers the first trigger signal to the dead time adjusting circuit and the controller circuit; and a driver circuit that drives the first switch or the second switch according to the signal generated by the controller circuit.

10. The control device of a switching regulator according to claim 9, the control device further comprising an error amplifier circuit that detects a difference between a reference voltage and an output voltage that is rectified and smoothed in a secondary side of the transformer, and delivers the difference to the voltage controlling oscillation circuit.

11. The switching regulator according to claim 1, switching regulator further comprising a controller circuit that receives a first trigger signal generated by a voltage controlling oscillation circuit and the second trigger signal that is generated by the dead time adjusting circuit and generates a signal to drive the first switch or the second switch.

* * * * *